April 29, 1969     A. N. MARSHALL     3,441,207
APPARATUS FOR SPEED INDICATION
Filed Feb. 20, 1967
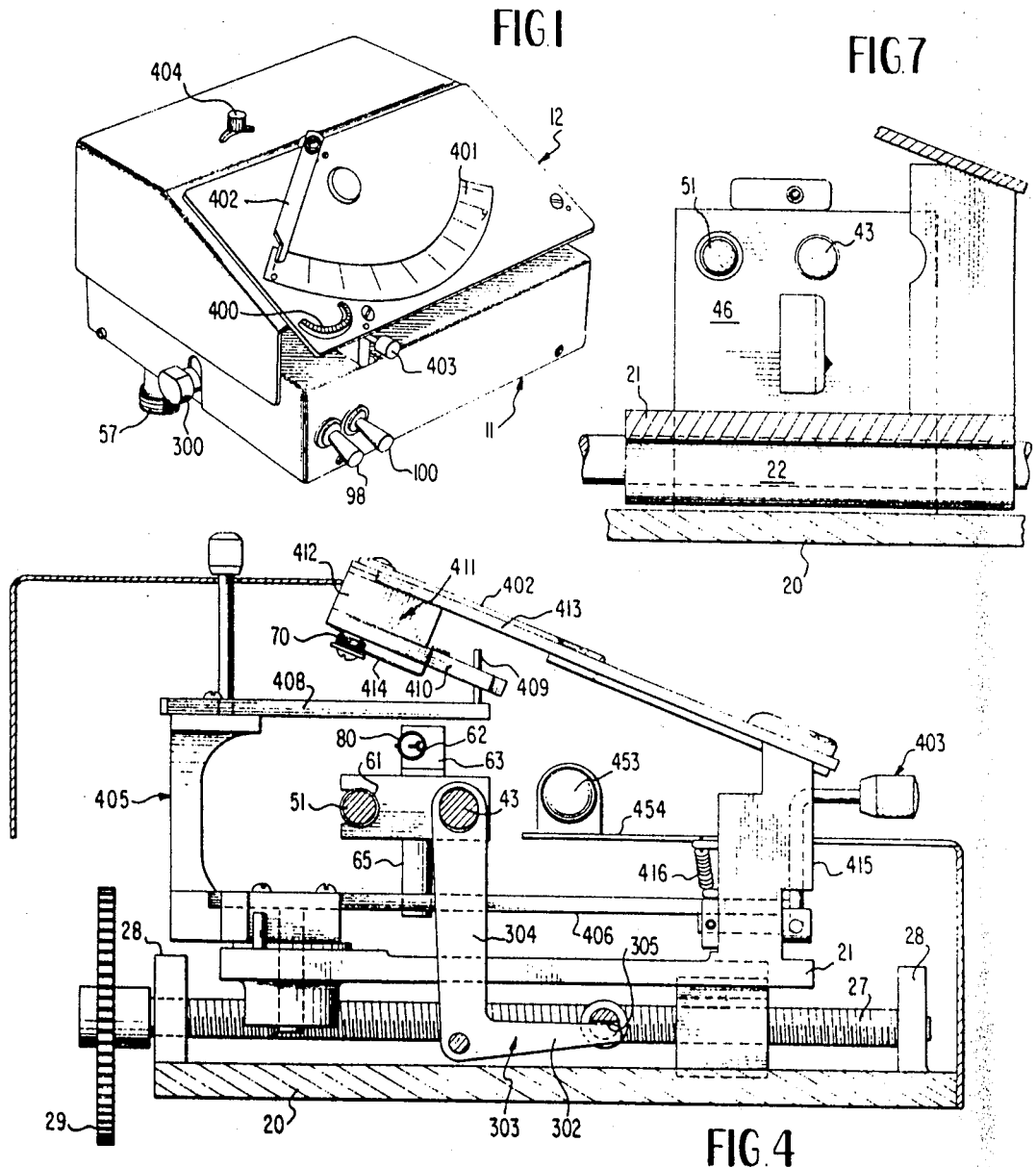
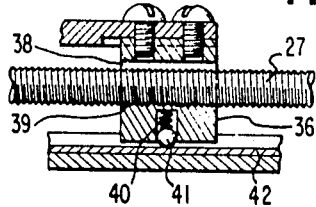
INVENTOR
ARTHUR N. MARSHALL
BY
ATTORNEYS

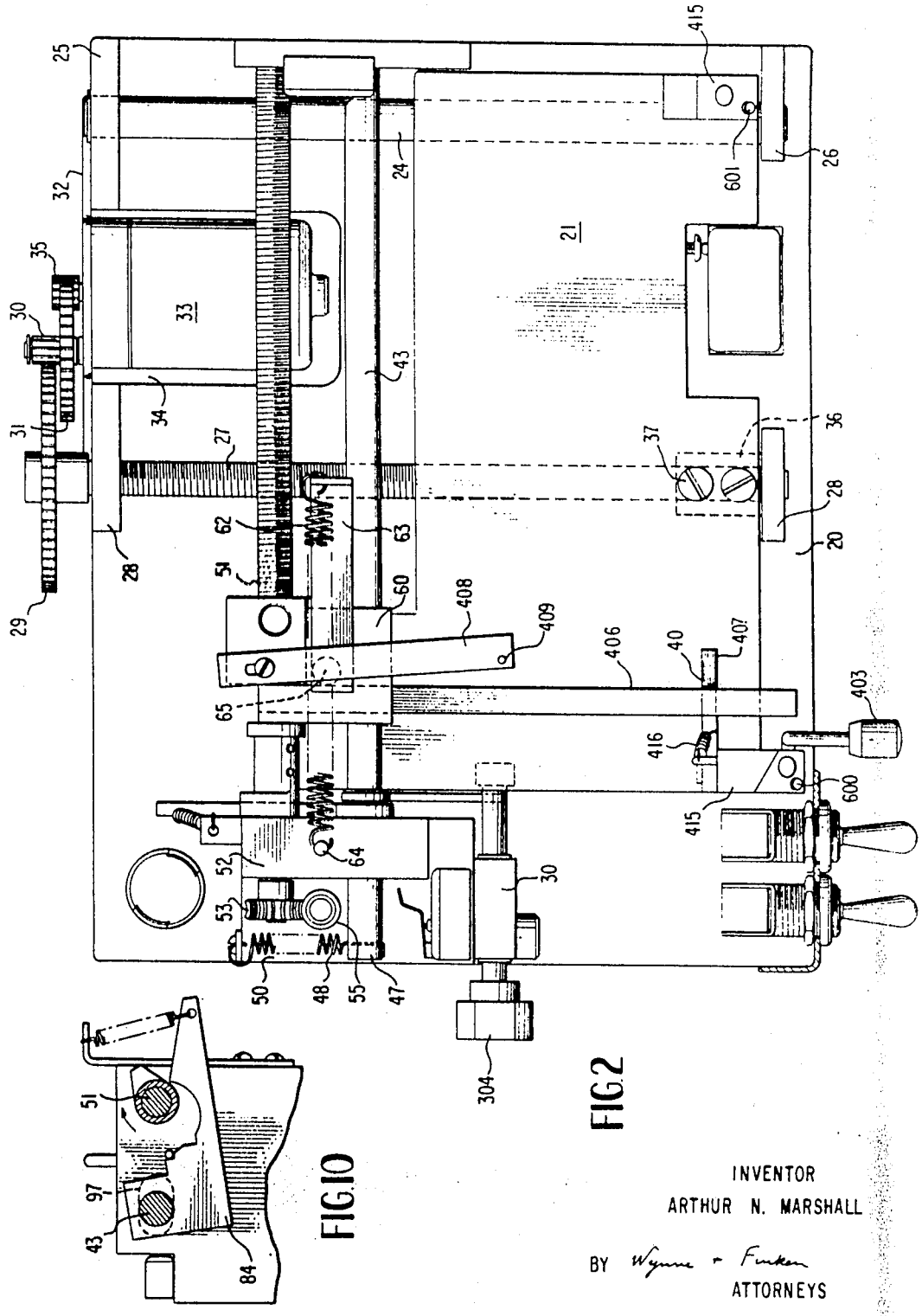

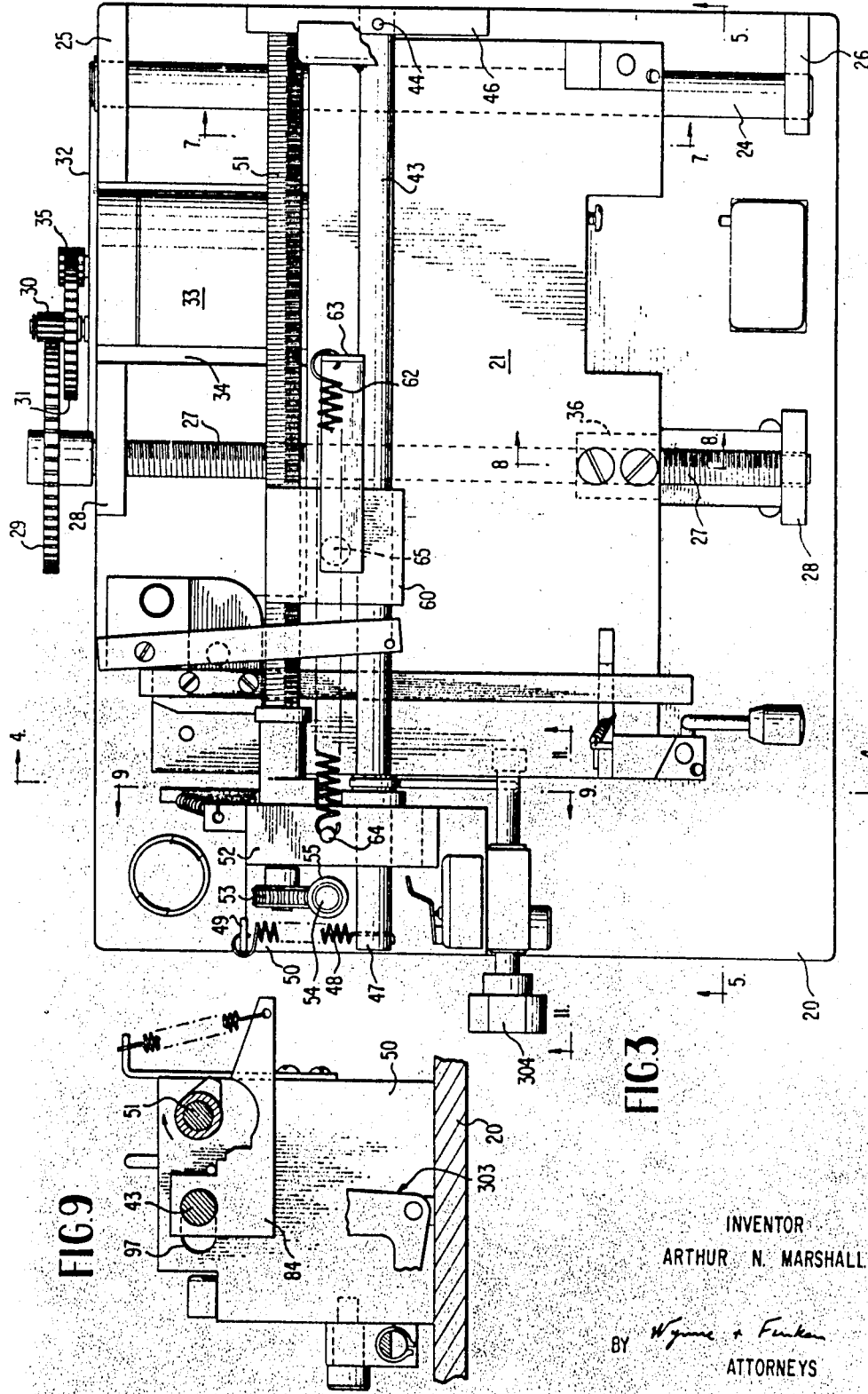

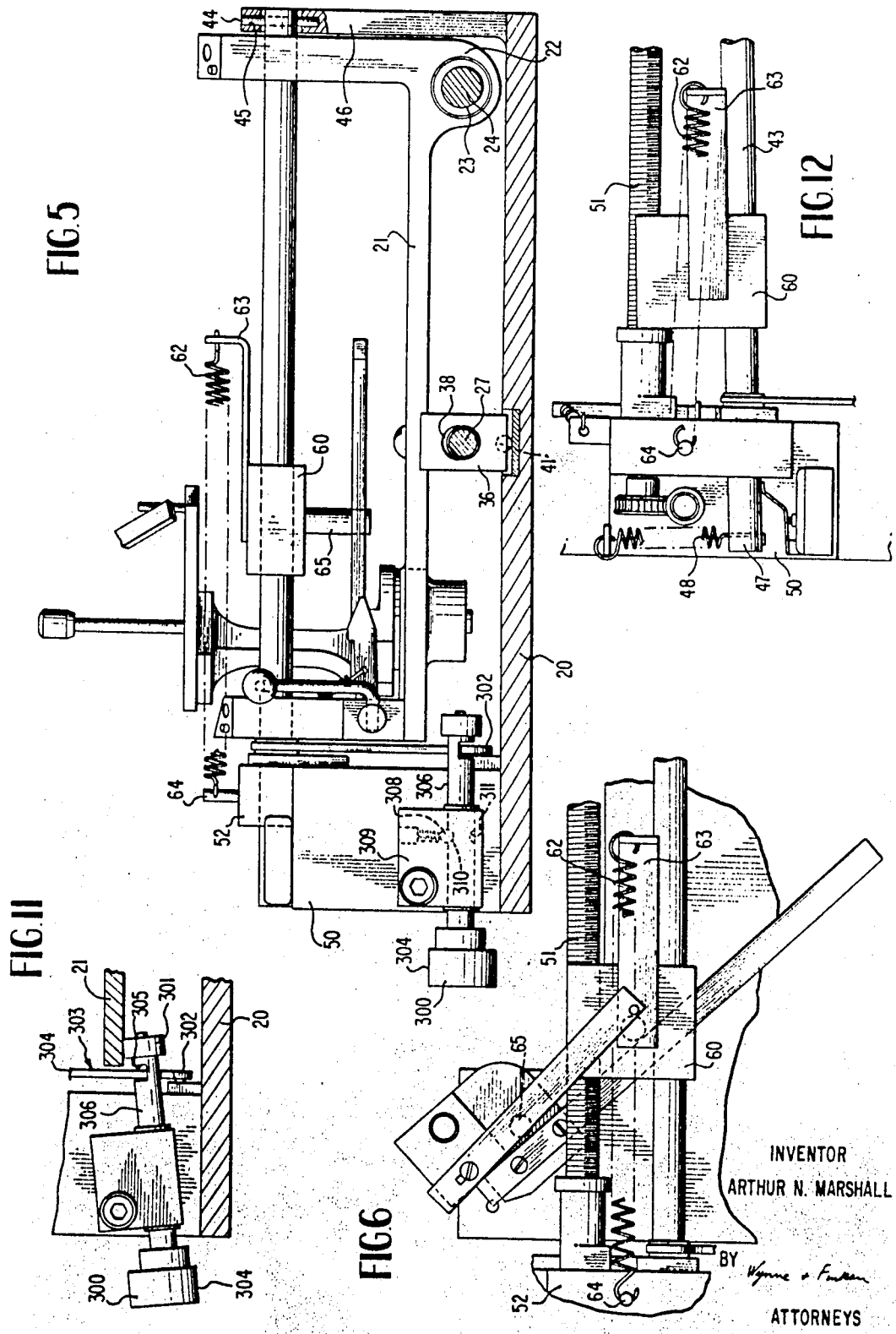

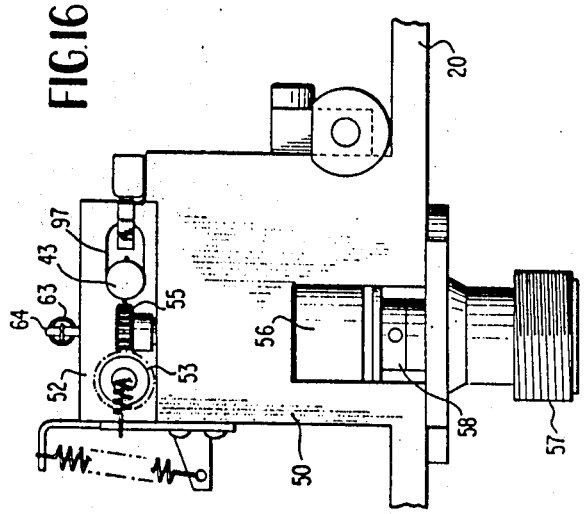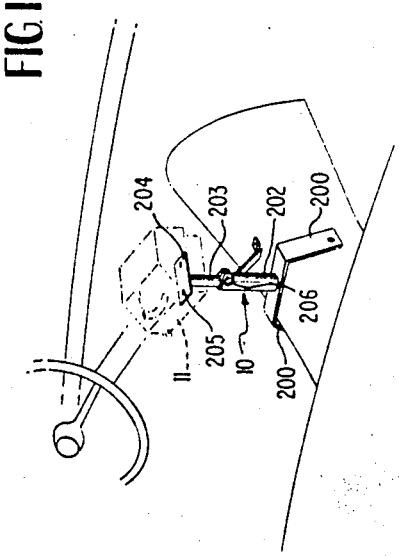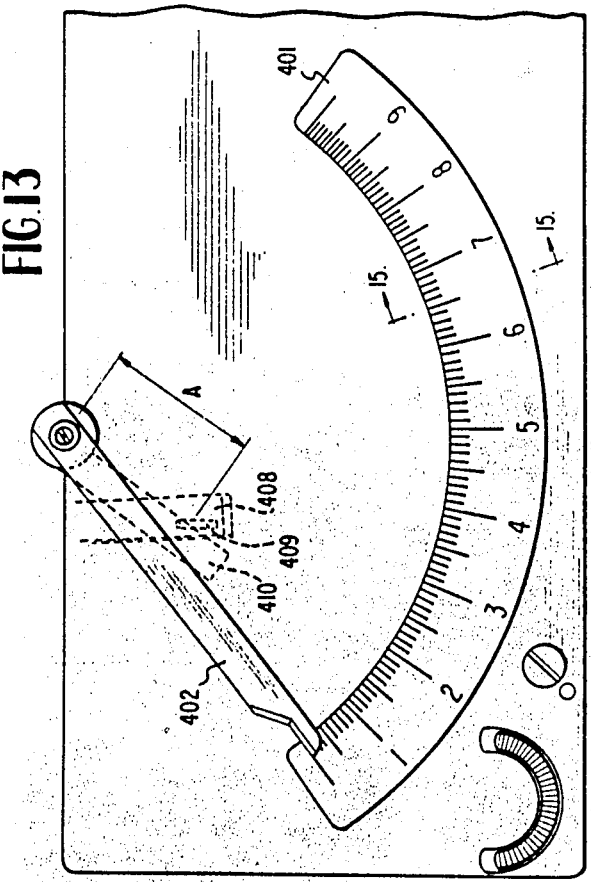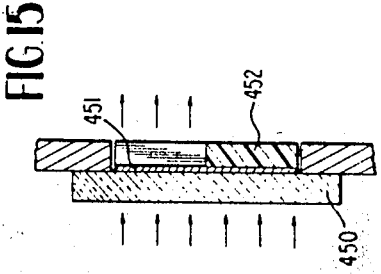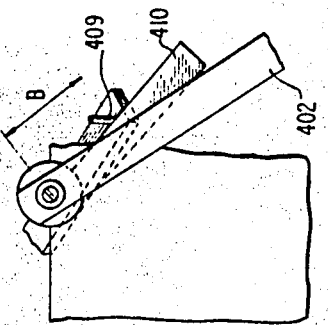

3,441,207
APPARATUS FOR SPEED INDICATION
Arthur N. Marshall, 5501 Kingsbury Road,
Richmond, Va. 23226
Filed Feb. 20, 1967, Ser. No. 617,385
Int. Cl. G01d 3/00
U.S. Cl. 235—61                                    13 Claims

ABSTRACT OF THE DISCLOSURE

An improvement in a device for speed determination having a time carriage means and a distance carriage means which move relative to each other to establish average speed, the improvement involving a hold means for retaining one of the carriage means at its advanced position to enable multiple speed determinations by actuation of the other carriage means, an arcuate scale, and means for enabling the stretching out of the higher speed increments of the scale, an adjustable strand, and other related improvements.

---

This invention relates to improvements in the apparatus for speed determination in U.S. Patent Nos. 3,182,331 of May 4, 1965, and 3,276,029 of Sept. 27, 1966, inventor Arthur Niemeyer Marshall. For purposes of a comparative disclosure, the patents are incorporated by reference.

The improvements to the apparatus of the mentioned patents enable the use of a slanted arcuate lighted scale, the retention of distance to enable the clocking of many speeding vehicles over a premeasured distance, the simplified mounting of the apparatus on the floor hump of a vehicle, and other related advantages.

A time carriage means and a distance carriage means are selectively movable to identify an average speed of a monitored vehicle. Return means are provided for enabling the zeroing of the two carriage means; however, a hold means is also provided for retaining the distance measurement so that further clocking of vehicles by time measurement alone can take place. The time carriage means is pivotally mounted at one side on a base and is movable to zeroing position upon downward pivoting, the hold means involving a pivotal slotted member whereby positioning of the slot prevents retraction action of the distance carriage means toward its zeroing position.

The distance carriage means is mounted for translation on the base and has a reference means in the form of a pin toward which a movable member on the time carriage means may move to establish a predetermined relationship identifying average speed of a monitored vehicle. A biased speed indicating needle assembly through a predetermined relationship with the movable member provides a speed reading on a scale. The movable member is pivotally mounted on the time carriage means as is the needle assembly. A sliding coaction of these components varies the point of contact therebetween toward and away from the pivotal axis of the needle assembly to provide increased arcurate movement of the needle at the higher speeds.

These and other structural improvements will be more fully explained hereinafter.

In the accompanying drawings forming a part of this application and in which like numerals are employed to designate like parts throughout the same, FIGURE 1 is a perspective view of the device;

FIGURE 2 is a plan view of the device with the cover removed and the device in zeroed position with the needle system latched;

FIGURE 3 is a view similar to FIGURE 2, with the component parts moved to a speed checking position, the needle system remaining in latched condition;

FIGURE 4 is a vertical section taken on line 4—4 of FIGURE 3;

FIGURE 5 is a vertical section taken on line 5—5 of FIGURE 3;

FIGURE 6 is a plan view showing the C-member of the needle system in position transmitting condition for speed read-out;

FIGURE 7 is a vertical section taken on line 7—7 of FIGURE 3, but with the carriage moved forward from the position shown in FIGURE 3;

FIGURE 8 is a vertical section of the time screw taken on line 8—8 of FIGURE 3;

FIGURE 9 is a vertical section taken on line 9—9 of FIGURE 3;

FIGURE 10 is a view similar to FIGURE 9, showing the unseated condition of the distance rod;

FIGURE 11 is a vertical section taken on line 11—11 of FIGURE 3, showing the distance hold system;

FIGURE 12 is a top plan view of the distance screw system with the distance rod in unseated condition;

FIGURE 13 is a view of the scale plate carrying the scale and in phantom lines showing the operating elements for controlling the needle;

FIGURE 14 is a view similar to FIGURE 13, with the elements at a high speed read-out position;

FIGURE 15 is a view taken on line 15—15 of FIGURE 13, showing the scale;

FIGURE 16 is a fragmentary side elevation of the distance measuring system; and

FIGURE 17 is a perspective view of a mounting stand for the device in installed condition.

FIGURES 1 and 17 show the apparatus as it appears to the user. It includes an adjustable stand 10, and the device itself which includes bottom unit 11 and a movable top unit 12.

The stand 10 (FIG. 17) includes a tripod of side legs 200, and forward leg 201 extending from lower tube 202 which is telescopically connected to upper tube 203 capped by mounting pad 204 for the mounting of the bottom unit 11 through bolt holes 205 which are preferably non-aligned. The tripod is preferably of bendable material to facilitate adjustment to various vehicle floor humps and the like. Thumbscrew adjustment means 206 enables vertical and angular positioning of the apparatus.

The fixed bottom unit 11 (FIG. 1) includes distance switch 98, time switch 100, odometer fitting 57, and distance hold knob 300, which is shown in its flat side up position whereby multiple speed checks may be made over a predetermined distance by simply using the time switch 100, as will be explained.

The movable top unit 12 includes thumb socket 400 for zeroing the machine, a slanted arcuate scale 401, needle 402, needle release button 403, and C-member button 404. When the top unit has travelled forwardly its maximum distance from the switches 98 and 100, it is physically possible and comfortable for the user to place his right hand palm up under the bottom unit 11 with this thumb in socket 400 and draw the top unit 12 back to zero position.

As recited in Patent No. 3,276,029, numeral 20 designates a rigid base plate, upon which all of the operating components are mounted. A carriage plate 21 is arranged above the base plate 20 in spaced superposed relation thereto for movement relative to the base plate in opposite directions and in a straight line path, as will be fully described. Near one side thereof, the carriage plate 21 has a depending integral bearing part 22 having a through bore 23, slidably receiving a cylindrical guide rod 24, having its ends rigidly anchored within openings formed in upstanding lugs 25 and 26 on the base plate 20 adjacent the forward and rear ends thereof. The carriage plate 21 is slidable lengthwise of the guide rods 24 and is also pivotal thereon for limited swinging movement toward and away from the base plate 20 upon the axis of the guide rod 24.

Means are provided to cause movement of the carriage plate 21 in a straight line and in one direction upon and relative to the stationary base plate 20, and which movement is in relation to the time interval during which the speed of a vehicle is to be checked over a selected distance course, as will be fully explained. Such means comprises a screw shaft 27 spaced from and parallel to the guide rod 24 and arranged at approximately the same elevation as the guide rod 24 above the base plate 20. The opposite ends of screw shaft 27 are suitably journaled for rotation within upstanding bearing parts 28 of base plate 20, preferably formed integral therewith. A relatively large gear 29 is rigidly secured to the forward end of screw shaft 27, forwardly of base plate 20 and associated elements and this gear meshes with and is driven by a small pinion gear 30, having an intermediate-size gear 31 rigid therewith, both of the gears 30 and 31 rotatably mounted upon a short stub shaft, secured rigidly to a mounting plate 32, in turn suitably rigidly secured to the front faces of lug 25 and bearing part 28.

An accurate constant speed electric motor 33 of a conventional type is bodily rigidly secured at its forward end to the mounting plate 32 and is disposed within an opening 34 of the base plate 20. The armature shaft of motor 33 has a small gear 35 mounted directly thereon and meshing with the reduction gear 31 to operate the train of gears between the motor 33 and screw shaft 27. The motor 33 has built-in conventional speed adjusting means, not shown, which may be operated with a screwdriver to assure extremely accurate operation.

A half nut element 36 is secured rigidly at 37 to the bottom of carriage plate 21 and has a vertically oblong through bore 38 having screw-threads 39 upon its bottom side only for coupling driven engagement with the screw shaft 27. The half nut 36 and associated elements are constantly urged upwardly resiliently toward positive engagement with the screw shaft 27 by a recessed coil spring 40 within the bottom portion of the half nut and having its lower end engaging a ball bearing 41 which may roll along a machined groove 42 in the top face of base plate 20. It may be seen that whenever the carriage plate 21 is manually depressed near its side remote from the guide rod 24 that the carriage plate will pivot downwardly upon the axis of the rod 24 and the spring 40 will yield and the threads 39 of the half nut 36 will disengage the threads of screw shaft 27, permitting the carriage plate 21 to be returned quickly manually toward the rear end of the base plate 20 having the elements 26 and 28. Normally, rotation of the screw shaft 27 under influence of the motor 33 and gearing and while the half nut 36 is coupled with the screw shaft 27, causes the carriage plate 21 and all parts mounted thereon to be moved forwardly upon the base plate 20 and along the axis of the guide rod 24, and this movement is representative of time elapsed during the tracking of a speeding vehicle over a selected distance course. The rotational speed of the clock motor 33, the reduction gearing, and the number of threads per inch on the screw shaft 27, such as 40 threads per inch, are all factors of design which contribute to the result of causing the carriage plate 21 to move along the screw shaft 27 a linear distance representative of the passage of an interval of time. In practice, 2½ inches of movement of the carriage plate 21 along the screw shaft 27 may represent one minute of elapsed time. This factor may be varied somewhat, as found desirable, within the scope and spirit of the invention.

Means are also provided in the invention to cause movement of a second element in a straight line path, preferably, but not necessarily, at right angles to the movement of the carriage plate 21 and representative of distance traveled by a vehicle during the elapsing of a given time interval. This means comprises a cylindrical guide rod 43 spaced above the carriage plate 21 and extending normally at right angles to the fixed guide rod 24, and having one end thereof pivoted at 44 upon a vertical pin, projecting through an opening 45 in an upstanding support extension 46 of base plate 20 adjacent one side thereof. The opposite extremity of guide rod 43 is freely disposed and carires a connecting lug 47, attached to a retractile coil spring 48, having its other end attached to a rigid arm 49 of a fixed bracket, rigidly secured to an upstanding block 50, formed integral with the base plate 20, as shown. A screw shaft 51 similar to the screw shaft 27 parallels the guide rod 43 at the same elevation as the latter and has one end journaled for rotation upon the support extension 46 and its opposite end journaled for rotation upon an upstanding wall extension 52 of block 50. A worm gear 53 is secured to the end portion of screw shaft 51, above block 50, and outwardly of wall extension 52, and this worm gear meshes with and is driven by a worm 55 carried by an upstanding shaft 54 extending through an opening in the block 50 and connected with and driven by the output component of an electromagnetic clutch 56, mounted within an internal chamber or recess of the block 50, FIGURE 16. The electromagnetic clutch 56 is conventional and need not be described in detail. A fitting 57 rigidly secured to the bottom of base plate 20 houses the input rotary component 58 of clutch 56, which input component is in turn connected with and driven by a flexible shaft connected with a rotary element of the vehicle transmission and therefore driven in a manner similar to an ordinary speedometer (odometer) cable or shaft. In fact, it is contemplated to utilize a dual outlet fitting on the vehicle transmission, not shown herein, one branch of which may be connected with a speedometer shaft and the other branch of which receives the shaft. Consequently, when the vehicle is in motion, the input shaft of clutch 56 is continuously driven but rotation is not imparted to the worm 55 until the electromagnetic clutch is energized by switch and circuit means to be described.

A carriage head 60 has a first opening, slidably receiving the guide rod 43 and is provided in its opposite side with an arcuate recess 61 having screw-threads for coupling engagement with the adjacent screw shaft 51. Consequently, when the elements 43 and 51 are parallel and the threads of recess 61 are engaged with the threads of screw shaft 51, rotation of the latter will drive the carriage head 60 longitudinally of the screw shaft in one direction, at right angles to the path of movement of carriage plate 21. A retractile coil spring 62 has one end secured to an extension 63 of carriage head 60 and its other end secured at 64 to fixed wall extension 52, whereby the spring resists movement of the carriage head 60 in one direction and causes automatic return of the carriage head in the opposite direction as will be further described. Carriage head 60 has a depending rigid cylindrical pin extension 65 fixedly mounted thereon and movable therewith for an important purpose as described.

An improvement of the instant invention involves the speed read-out system for accurately converting the position of carriage head extension 65 into a speed reading by needle 402 on scale 401. C-member 405 is pivotally mounted on a forward left corner of the carriage plate 21. The bottom leg 406 of C-member 405 is of sufficient length selectively to engage the carirage head extension 65 and the latch 407 of needle release button 403. The top leg 408 C-member 405 includes a follower 409 which is positioned for moving engagement by pusher bar 410 of the needle assembly 411.

The needle assembly 411 shown in FIGURES 4, 5, 13 and 14 is mounted in bearing 412 in scale plate 413 with the needle 402 and pusher bar 410 affixed to opposite ends of a common shaft for movement therewith. A coil needle spring 414 urges the needle assembly in a counter-clockwise direction as shown in FIGURE 4 to urge the pusher bar 410 against the follower 409 of the C-member 405.

The needle release button 403 is pivotally mounted on the left pillar 415 (FIG. 4) of the carriage plate 21 so that its latch 407 can receive and retain (FIG. 2) the bottom leg 406 of C-member 405, an upward locking bias on the pivoting latch 407 being provided by spring 416 connected to pillar 415. When a speed reading is desired, the needle release button 403 is swung clockwise (FIG. 1) releasing leg 406; the needle spring 414 then causes the pusher bar 410 to swing the C-member top leg 408 counter-clockwise until the C-member bottom leg 406 engages the carriage head extension 65 (FIG. 6). The needle 402 will then point to the speed reading on scale 401.

When there is a distance measurement and no time measurement fed into the device, the carriage head extension 65 may reach a far right position allowing the needle 402 to pass beyond the right hand upper limit of scale 401. A C-member button 404 is provided for swinging the C-member 405 and needle assembly 411 counter-clockwise back to latched condition in preparation for timing of vehicles over the premeasured distance.

It will be noted (FIG. 13) that scale 401, while arcuate, is not an arc of a circle and that the spaces thereon are not equal. The I-member 405 and needle assembly 411 combination shown and described are designed to produce a stretch-out of the right side, higher speed portion of the scale 401. FIGURES 13 and 14 show at measurement lines A and B respectively the shortening radius effect on the needle assembly pusher bar 410 of the slidably engaging C-member follower 409 when the right side, higher speed portion of the scale is reached by the needle 402, thereby producing increasing increments of angular movement of the needle assembly 411 for each equal increment of angular movement of the C-member follower 409. The drawings also show the offset mounting of certain elements of the speed read-out system which enable the proper alignment of driving and driven elements to produce a faithful position transmission between the carriage head extension 65 and the needle 402.

The means for zeroing the time system is substantially the same as in my Patent 3,276,029 and similar structural parts and switches are shown herein.

An improved combination of elements, however, is provided for enabling either the holding or zeroing of the distance system when the operator executes the simple pull back movement of the movable top unit 10 to zero the device. If distance is to be zeroed, the action involves a downward swinging of the movable top unit 10 and its carriage plate 21 about rod 24 which causes the plate 21 to engage and depress roller 301 and the horizontal arm 302 of bell crank 303 (FIG. 11) thereby causing the vertical arm 304 of the bell crank to swing the guide rod 43 and carriage head 60 horizontally rearwardly from the position of FIGURES 2 and 4 to the position of FIGURE 12. Spring 62 then pulls the carriage head 60 back to a position whereby cycling of the screw shaft 51 to a precise zero position can take place as explained in my Patent 3,276,029. It will be noted in FIGURES 9, 10 and 16 that the latch arm 84 is of similar design but that guide rod 43 is slidably mounted in a horizontal extending elongated hole 97 as opposed to the open solt. If it is desired to hold or retain the distance in the device (that is, prevent movement of the carriage head 60 relative to the distance screw shaft 51) when the normal full back zeroing movement is made by the operator, the distance hold knob 300 is rotated to place the flattened signal surface 304 up, as shown in FIGURES 2, 3 and 5, to rotate the bell crank receiving slot 305 in the knob shaft 306 into a seated position over and around the horizontal crank arm 302. When in this seated position, the carriage plate 21 does not pivot the crank arm 302 downwardly to release the carriage head 60 from distance screw shaft 51; the amount of arcuate pivotal movement of the carriage plate 21 (and top unit 12) is restricted by the time screw shaft 27 and its half nut element 36 of FIGURE 8.

If distance is to be zeroed, the distance hold knob 300 is positioned with the signal surface 304 down as shown in FIGURE 11. This places the knob shaft 306 directly on the crank arm 302 whereby downward movement of carriage plate 21 engages knob roller 307 and pivots arm 302 downwardly to draw guide rod 43 rearwardly as seen in FIGURE 10 and release the carriage head 60 from the screw shaft 51 for sliding zeroing movement by spring 62. FIGURE 5 shows a means 308 for providing a "feel" to the rotational movement of the knob 300 so that the operator can be certain it is in a fully seated and retained position. A spring biased ball 308 is housed in knob bearing 309 (FIG. 5) for biased seating in diametrically opposed seats 310 and 311 in the knob shaft 306 conforming to the two distance hold or distance release positions respectively of the knob 300.

FIGURE 15 shows the improved scale 401 as being a laminated build-up of an inner clear member 450 of plexiglass, an intermediate translucent member 451 of a milky plexiglass about ⅒ inch thick, and an outer member 452 about 1/32 inch thick of Formica with scale lines cut therethrough. The proportions of thickness may vary and FIGURE 15 shows a scale of different proportions.

FIGURE 4 shows a scale light 453 with its buffed bottom steel mirror 454.

FIGURE 2 shows alignment pins 600 and 601 extending upwardly from left and right pillars 415, 415 which insure proper position of the needle assembly with respect to the C-member.

It is to be understood that the forms of the invention herewith shown and described are to be taken as preferred examples of the same, and that various changes in the shape, size and arrangement of parts may be resorted to, without departing from the spirit of the invention or scope of the subjoined claims.

I claim:

1. In an apparatus for use upon a motor vehicle for checking the speed of another vehicle comprising a time carriage means having linear movement from a zero position representative of elapsed time, a distance carriage means having linear movement from a zero position representative of distance travelled, control means for selectively setting into advancing motion and stopping said time and distance carriage means beyond their respective zero positions to establish the average speed of another vehicle, speed indicator means connected with said time and distance carriage means and having its speed indicating position determined by the stopped positions of said time and distance carriage means, return means for retracting said time and distance carriage means to a position adjacent their respective zero positions, and hold means for preventing the retraction of one of said carriage means to enable checking of speed by using the other carriage means.

2. In an apparatus as defined in claim 1, and wherein said hold means includes a hold knob rotatably mounted on a fixed axis with respect to the line of movement of the distance carriage means and movable to nullify the effect of the return means on the distance carriage means to enable the retention of the distance position of the distance carriage means for timing of vehicle over the same distance.

3. In an apparatus as defined in claim 2, and wherein said return means includes a pivotal mounting means for the time carriage means and a coacting means including said hold knob between the time and distance carriage means for enabling retraction of both upon pivoting of the distance carriage means, said hold knob having a slot therein for receiving the distance carriage means on pivoting to prevent retraction of the distance carriage means.

4. In an apparatus for use upon a motor vehicle for checking the speed of another vehicle comprising a time carriage means having linear movement from a zero position representative of elapsed time, a distance carriage means having linear movement from a zero position representative of distance travelled, control means for selectively setting into advancing motion and stopping said time and distance carriage means beyond their respective zero positions to establish the average speed of another vehicle, one of said carriage means having a reference means, the other of said carriage means having a movable member constructed and arranged for movement into a predetermined relationship with said reference means, and a speed indicating needle assembly movably mounted on said other of said carriage means and having its speed read-out position determined by the position of said movable member.

5. In an apparatus as defined in claim 4, and wherein said movable member is a pivotal C-member having a top leg and bottom leg for contacting said reference means, and said needle assembly includes a bottom pusher bar, a top needle, and biasing means for rotationally urging said pusher bar and needle in a direction such that said pusher bar forces said bottom leg against said reference means to place said top needle in speed read-out position.

6. In an apparatus as defined in claim 5, and including an arcuate speed scale over which said top needle swings, said pusher bar engaging said top leg in a sliding manner such that at higher speed readings the point of contact of the pusher bar with the top leg progresses inwardly toward the pivotal axis of the pusher bar to increase the concomitant arcuate speed readout movement of the needle.

7. In an apparatus as defined in claim 6, and including a latch means for releasably holding said C-member bottom leg.

8. In an apparatus as defined in claim 7, and including a C-member button for pivoting said C-member.

9. In an apparatus as defined in claim 4, and wherein said movable member and said needle assembly are pivotally mounted about spaced axes, said movable member engaging said needle assembly in a sliding manner such that the point of contact therewith moves toward and away from the pivotal axis of said needle assembly.

10. In an apparatus as defined in claim 9, and including return means for retracting said time and distance carriage means to a position adjacent their respective zero positions, and hold means for preventing the retraction of one of said carriage means to enable checking of speed by using the other carriage means.

11. In an apparatus as defined in claim 10, and including a stand having bendable tripod legs for adjustable mounting on the floor hump of a vehicle and telescoping adjustable tubes with a mounting pad at the top.

12. In an apparatus as defined in claim 11, and including a thumb socket in said time carriage means for facilitating the zeroing of same.

13. In an apparatus as defined in claim 12, and including a scale on said first carriage means including an inner clear member, an intermediate translucent member and an outer member having scale lines cut therein.

References Cited

UNITED STATES PATENTS

| | | | |
|---|---|---|---|
| 1,450,410 | 4/1923 | Cox | 235—61 |
| 3,276,029 | 9/1966 | Marshall | 346—18 |

STEPHEN J. TOMSKY, *Primary Examiner.*

U.S. Cl. X.R.

346—18